Nov. 22, 1966   G. G. RUMBERGER   3,286,906
HEAT SEALABLE CONTAINERS

Filed Nov. 5, 1963   2 Sheets—Sheet 1

INVENTOR.
GEORGE G. RUMBERGER
BY
*Gordon V. Huerschen*
ATTORNEY

Nov. 22, 1966     G. G. RUMBERGER     3,286,906
HEAT SEALABLE CONTAINERS
Filed Nov. 5, 1963     2 Sheets-Sheet 2
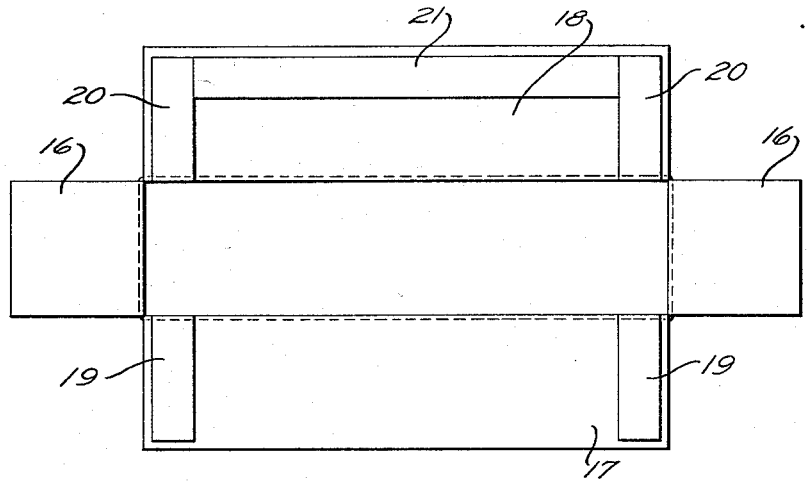
FIGURE 9
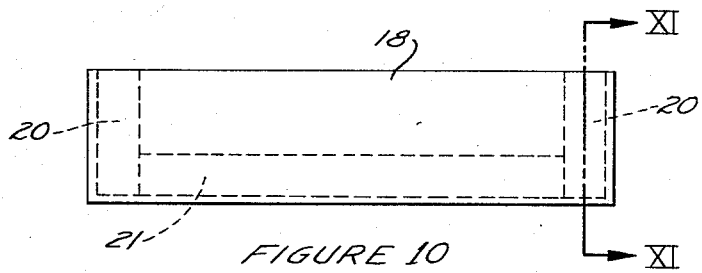
FIGURE 10
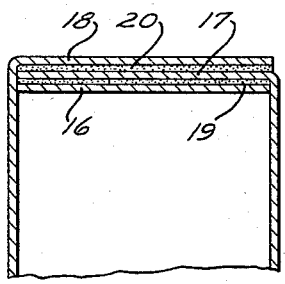     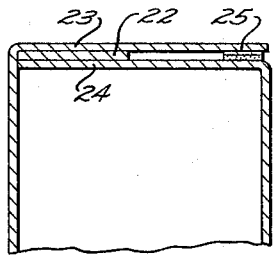     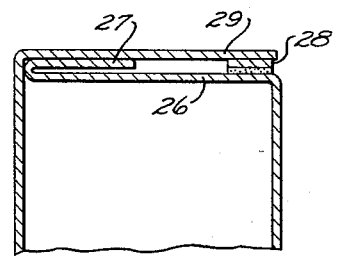
FIGURE 11     FIGURE 12     FIGURE 13
INVENTOR.
GEORGE G. RUMBERGER
BY
ATTORNEY

United States Patent Office 3,286,906
Patented Nov. 22, 1966

3,286,906
HEAT SEALABLE CONTAINERS
George Glen Rumberger, Kalamazoo, Mich., assignor, by mesne assignments, to Brown Company, New York, N.Y., a corporation of Delaware
Filed Nov. 5, 1963, Ser. No. 321,471
12 Claims. (Cl. 229—37)

The present invention relates to heat sealable containers, especially heat sealing cartons, and is more particularly concerned with container and carton structures having localized heat sealing areas therein, and with novel methods for their manufacture.

Although it has long been considered desirable to utilize heat sealing containers, especially cartons, the attainment of this objective has not been realized to the complete satisfaction of the container industry or utilizers or consumers of such containers. For example, many compositions have excellent heat sealing properties. However, some of these compositions cannot be applied to precut carton blanks on the surface to be sealed in a sufficient quantity to provide adequate heat sealing due to their highly viscous nature. Others are difficult to use on cartons due to the inclusion of solvents which must subsequently be eliminated. Moreover, even though it might sometimes be desirable to have overall heat sealing surfaces on certain carton structures, in many cases it is sufficient to have heat sealing media only in localized areas of the desired seals, and numerous compositions such as organisols and plastisols lack adequate means for their localized application. Attempts have also been made to apply hot melt adhesives or thermoplastic materials to localized areas of precut carton blanks, or of the sheets from which they are cut. This method of application, although successful to a limited extent, has not permitted the application of sufficient adhesive to bridge gaps, permeate pinholes, or form fillets at carton edges, due to the limited amount of adhesive which can be applied. In other cases certain adhesives which would ordinarliy be most desirable for use as heat sealing media cannot be applied locally in the desired areas due to their becoming stringy when hot or due to excessively thixotropic properties or other characteristics of these materials in the molten state which tend to impede or retard their satisfactory application. Since most of these compounds are highly viscous, and since intaglio methods are generally used for their application, there is a severe limitation on the amount and type of adhesive which can be applied in the molten or fluid state to localized areas of cartons or carton blanks.

It is, therefore, an object of the present invention to provide heat sealing cartons, carton blanks, and sheet materials from which they are formed, all having localized means for the application of thermoplastic adhesive, and an improved method for their manufacture.

It is a further object of this invention to provide a method and means for applying thermoplastic adhesives to container, e.g., carton blank and carton, surfaces in amounts heretofore impossible, and whereby the thermoplastic adhesive may be readily oriented in any desired location or configuration in any carton, carton blank, or other container structure.

It is an additional object of this invention to provide a light bearing sheet or web carrying a thermoplastic adhesive, either on its surface or intercalated, which thermoplastic adhesive bearing sheet may be cut into desired configurations and applied to the faces of a carton or carton blank with another adhesive to secure the same to particular areas of the carton or carton blank which are to be heat sealed to other areas thereof.

Additional objects will be apparent to one skilled in the art and still other objects will become apparent hereinafter.

According to the present invention a sealing material is provided in patch or strip form comprising at least one web of a material such as paper with a relatively thick layer of a thermoplastic adhesive applied to one side, and another adhesive, herein referred to as a "heat-insensitive" adhesive, which is preferably but not necessarily non-thermoplastic, applied to the other. If desired, the sealing material may be provided in the form of a continuous web strip wound in a roll and provided with lines of severance or weakening, e.g., perforated, scored, or serrated, to define detachable areas or patches which may be readily disconnected from the roll. The patches or strip material are applied to the flaps of a carton blank or carton to be ultimately sealed by means of heat-insensitive adhesive, or even to the sheet material from which the carton blank is to be cut. Subsequently, the patches are heated immediately prior to or after closing of the carton to melt or activate the thermoplastic adhesive. The flaps are then held in place until the adhesive cools and sets to provide a seal. In another embodiment, the patch or strip material may be provided in the form of two webs with the thermoplastic adhesive intercalated therebetween. In such case, one web is provided with openings for extrusion of the thermoplastic adhesive, and the other web is provided with a layer of heat-insensitive adhesive on its surface. The strip material may then be used in the same manner as that prepared from only a single web.

As employed herein, the term "thermoplastic" is used in its broad sense, that is, denoting a material having the property of softening or fusing when heated, and hardening and becoming rigid again when cool. The term is not used in its special sense as sometimes applied to synthetic resins where it denotes permanently fusible materials, that is, materials which can be remelted and cooled time after time without undergoing any appreciable change, as distinguished from thermosetting or heat-reactable resins which undergo change upon heating. Whether the sealing material undergoes change or not during the heating and sealing period is immaterial if the heating and cooling involved in the sealing process can be accomplished before the sealing material has undergone sufficient change to render it inoperative. So-called "heat-reactable" or thermosetting materials may be used if the adhesive is activated and the parts to be adhered placed in position before the adhesive sets.

As the "heat-insensitive adhesive may be employed any conventional adhesive, such as glue, which does not lose its adhesive properties upon being subjected to heat. Thermoplastic adhesives may also be used as this adhesive, although they are not preferred. If used they should be of sufficient viscosity when heated so as not to permit displacement of the patch adhered to the carton or other container member therewith.

The steps of activating the thermoplastic adhesive with heat and folding the flaps to closed position for sealing may be accomplished in either order. For example, the flaps containing the adhesive patches may be heated in open position by any suitable heating means and then closed and permitted to set. Ordinarily, a slight pressure as by a belt or other suitable means is employed to hold the flaps in closed position while the adhesive sets, and cooling or a heat-transfer, especially heat-sink, means may also be employed if desired to facilitate more rapid setting. Alternatively, the flaps may be closed first and heat subsequently applied to the outer flap to activate the adhesive.

In a selected carton, the adhesive patches may be adhesively affixed to either member of the inner or outer end flaps, or both, or to the outer and intermediate flaps, and subsequently adhered to the other of the inner or outer members or to an intermediate end flap by means of the thermoplastic adhesive. In other forms of containers, one member may be secured to another in the same manner, e.g., a closure member to a container body member. Any series of carton or other container cover flaps or closure members can be thus secured.

The invention in several preferred embodiments is illustrated by the accompanying drawings in which:

FIGURE 9 is a top view of a carton with all the flaps horizontally extended, illustrating the placement of the adhesive strips prior to sealing the carton.

FIGURE 10 is a top view of the sealed carton.

FIGURE 11 is a cross-sectional view taken at the line XI—XI of FIGURE 10.

FIGURE 12 is a cross-sectional view of another embodiment of the invention.

FIGURE 13 is a cross-sectional view of a further embodiment of the invention.

Reference is now made to the accompanying drawings for a better understanding of the invention, wherein all the parts are numbered and wherein the same numbers are used to refer to corresponding parts throughout.

Figure 1:
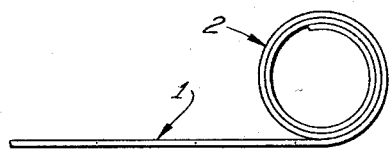
FIGURE 1 is an elevational view of a roll of heat sealing patch material in perforated strip or tape form.
Figure 2:
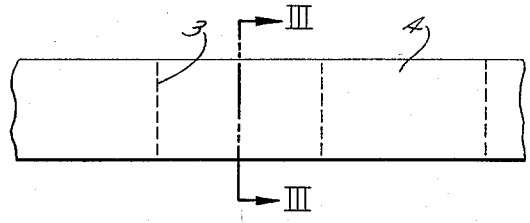
FIGURE 2 is a top view of a segment of tape showing the perforation lines which define the individual patches.
Figure 3:
FIGURE 3 is a cross-sectional view through a patch taken at the line III—III of FIGURE 2.

FIGURES 1–3 illustrate one embodiment of the invention comprising an adhesive strip 1 in the form of a roll 2, as shown in FIGURE 1. The strip 1 is provided with perforations 3 defining a plurality of adhesive patches 4. The material comprises a paper web or sheet 5, and a thin layer of a heat-insensitive adhesive 6, preferably a nonthermoplastic material such as glue which is used to adhere the patches to the carton flaps. On the other surface of the paper web 5 is a layer of a thermoplastic adhesive 7 comprising a material such as wax.

In a preferred embodiment, the adhesive strip may take the form of a multiply laminated material comprising two webs of material such as paper and/or paperboard with the thermoplastic adhesive intercalated therebetween. The glue or other heat-insensitive adhesive is applied to the outer surface of one web. The other web may be provided with openings such as slits or perforations communicating with the thermoplastic adhesive to enable the adhesive to be extruded to the outer surface of the web when heat is applied.

Figure 4:
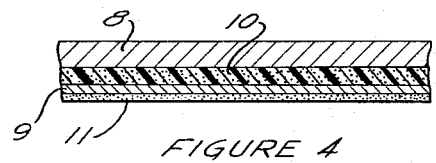
FIGURE 4 is a cross-sectional view of patch material prepared from multiply laminated stock according to another embodiment of the invention.

A cross-section of the multiply laminated form is shown in FIGURE 4 and comprises a pair of paperboard and paper webs, respectively 8 and 9, an intercalated layer of thermoplastic adhesive 10, and an outer adhesive 11.

Figure 5:
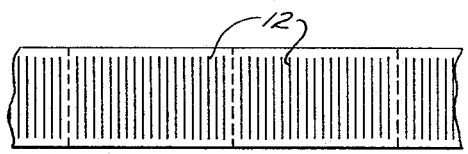
FIGURE 5 is a top view of a segment of multiply laminated material such as shown in FIGURE 4 illustrating transverse slits provided in an outer web communicating with the intercalated thermoplastic layer.
Figure 6:
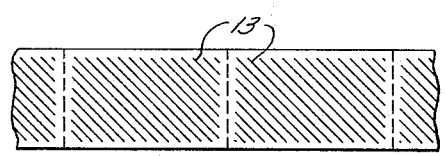
FIGURE 6 is a top view of a segment of material showing diagonal slits communicating with the intercalated thermoplastic layer.
Figure 7:
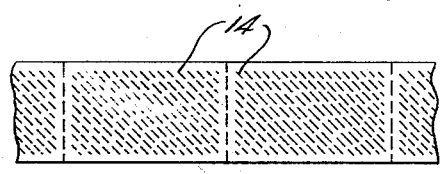
FIGURE 7 is a top view of a segment of material showing a plurality of small diagonal slits communicating with the intercalated thermoplastic layer.
Figure 8:
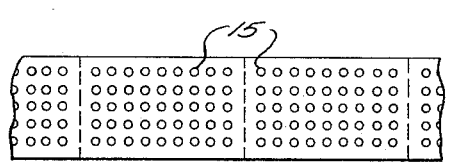
FIGURE 8 is a top view of a segment of sheet material showing a plurality of small holes communicating with the intercalated thermoplastic layer.

Various forms of openings may be provided in the web 8 communicating with the thermoplastic adhesive 10. In FIGURE 5 are shown a plurality of transverse slits 12. In FIGURE 6 are shown a plurality of diagonal slits 13. In FIGURE 7 are shown a plurality of small diagonal slits 14, whereas in FIGURE 8 are shown a plurality of circular holes 15.

The adhesive patches of the invention may be applied to the sheet or web from which a carton blank is to be cut, to the carton blank or, alternatively, to the carton itself after erection, e.g., immediately prior to the sealing of each set of flaps. In FIGURE 9 is shown a top view of the end of a carton with its flaps extended. The flaps comprise a pair of tuck or inner end flaps 16, an intermediate end flap 17 and an outer end flap 18. A pair of adhesive patches 19 are applied to the intermediate end flap 17 and adhesive patches 20 and 21 are applied to the outer end flap 18.

In sealing the end of the carton, the tuck flaps 16 are folded in and the intermediate and outer end flaps 17 and 18 are heated, causing the thermoplastic adhesive to melt. The intermediate flap 17 is then folded in and adhered by patches 19 to the tuck flaps 16. The outer end flap 18 is then folded over the intermediate end flap 17, patches 20 and 21 causing the outer end flap 21 to become affixed to the intermediate end flap 17. A cross-sectional view of the sealed carton is shown in FIGURE 11. Alternatively, one or both of end flaps 17 and 18 may be folded in before application of heat and maintained in this position until at least partial setting of the adhesive.

The patches shown as 19, 20 and 21 may be either of the single web type as shown in FIGURES 1–3, or the double web type as shown in FIGURES 4–8.

In one embodiment of the invention it is desirable to have the patches bearing the thermoplastic adhesive of a thickness equal to, or even exceeding, the thickness of the sheet stock from which the carton is constructed. This is particularly the case when an outer or intermediate flap must seal to one of a plurality of inner flaps which are of unequal length of breadth. For this application the multiply sealing patches and strips shown in FIGURES 4–8 are particularly useful as they can readily be provided in various thicknesses. For example, in FIGURE 12 the intermediate flap 22 between the outer end flap 23 and the inner end flap 24 is partially recessed or cut away. The space is compensated for by the thickness of patch 25.

Other carton structures in which it is desirable to use a relatively thick patch of material, equal to or greater in thickness than the carton body sheet stock, are representatively those wherein an intermediate flap is folded back upon itself, such as to form a pour spout or opening device, as shown in FIGURE 13. FIGURE 13 also illustrates a structure wherein an intermediate flap might be designed to be folded back upon itself to form a space for a tear strip underlying a fracturing zone, in which case the end or tuck flaps could be folded in as intermediate flaps cut to fit into the empty space between the top flap and the folded flap. In the structure shown in FIGURE 13, the closure comprises an inner flap 26 and a folded over intermediate portion 27. Patch 28 secures outer flap 29 to inner flap 26.

In other embodiments of the invention, it is sometimes desirable to provide a relatively thick patch bearing a thermoplastic adhesive, and secure it to a given zone of a carton having flaps, a portion of which flap or flaps has been cut away in order to form, for example, pour spout structures, siftproof cartons, and the like.

Figure 14:
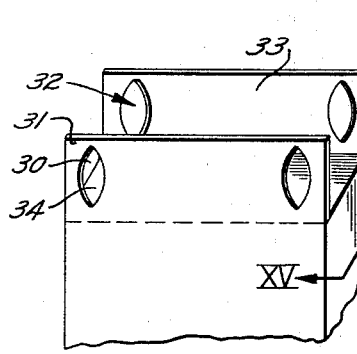
FIGURE 14 is a perspective view of the top of a carton constituting still another embodiment.
Figure 15:
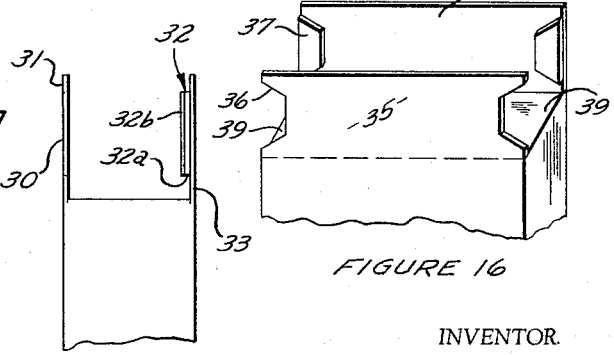
FIGURE 15 is a cross-sectional view taken at the line XV—XV of FIGURE 14.

In FIGURES 14 and 15 is shown another embodiment in which a cut-out 30 is provided in the intermediate flap 31 of approximately the same dimensions as an adhesive patch 32 affixed to the inner surface of the outer flap 33. The carton is sealed by heating the outer end flap to melt the adhesive, folding in the intermediate flap 31, and folding the outer flap 33 thereover. The heating may also be applied subsequent to folding. The patch 32 is positioned so that it is juxtaposed over the opening 30 when the flaps are in folded position, passing into the opening and becoming affixed to the inner or tuck flap 34. In this embodiment the adhered thermoplastic bearing patch not only serves to adhere the inner flap securely to the outer flap, but also serves to lock the flaps in position upon closing and sealing in such a way that rotational movement or springback of the scores does not result in the carton becoming out-of-square. When a multiply laminated patch is used in this embodiment, it also more securely seals the cut edges of the opening or cut-out 30.

Figure 16:
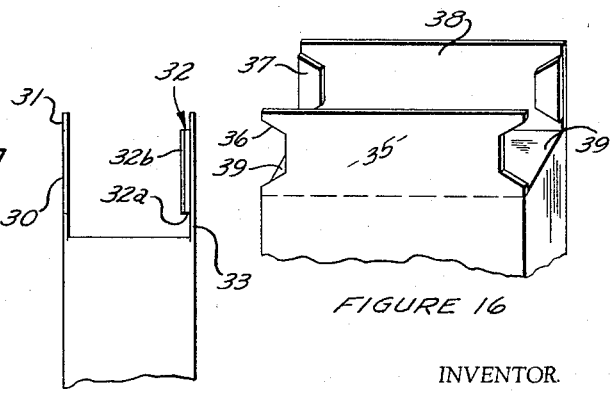
FIGURE 16 is a perspective view of the top of a carton constituting still another embodiment of the invention.

Thick patches bearing thermoplastic adhesive are also particularly suitable for forming a substitute for the so-called Van Buren ear by cutting away an intermediate flap, applying a relatively thick thermoplastic bearing patch to an inner or outer flap, and positioning the two in overlying relationship to form a direct seal between the outer flap and an inner flap. Such an embodiment is illustrated by the perspective view of FIGURE 16 in the form of a carton designed to contain materials such as starch or other powdery material. In this embodiment the intermediate end flap 35 is provided with notches 36, and adhesive paperboard patches 37 having a thickness approximately equal to that of the carton body stock are so positioned on the inner surface of the outer flap 38 that, when the outer flap 38 is closed over the intermediate flap 35, the patches 37 are engaged in the notches 36. Upon closing and applying thermoplastic adhesive activating conditions, the outer flap is securely attached to the tuck flaps 39, thus providing a siftproof positive seal. Moreover, the intermediate flap 35 is further sealed by extrusion of adhesive from the cut edge of the patch 37.

In further embodiments, the patches may extend along the entire side of the inner or outer flap carrying the same, with a suitable cut away edge being provided in the intermediate flap to provide recesses for receiving the same and allow direct bonding of the patch to the other member of said inner or outer flaps. Innumerable other embodiments and designs along the lines illustrated will also be apparent to one skilled in the art.

The following procedure may be used to prepare adhesive patches or strips according to the invention. A thermoplastic adhesive is applied to a light web or sheet, preferably a cellulose sheet or web such as a light paper or paperboard sheet, preferably a sheet having a basis weight of from about 15 to about 50 pounds per ream (3000 square feet) by means which are well known in the art. For convenience, such web is preferably continuous. Well-known application methods such as roll doctors, roll applicators, reverse roll coaters, wire wound metering rods, organosol coaters, or the like, may be used, with or without additional smoothing blades or smoothing rolls, as the case may require. In general, it is preferred that the thermoplastic adhesive be applied to the bearing sheet on one side only, in an amount in excess of 10 pounds per ream, and preferably in excess of 20 pounds per ream. When it is necessary simultaneously to seal and caulk apertures, joints, pinholes, and the like, larger amounts may be applied, even as great as 100 pounds per ream.

After the bearing sheet has been coated, it is generally cut into narrow bands or strips, suitable for cutting into patches and which will generally be the exact width required for the patches. These patches are then adhesively secured with a heat insensitive adhesive, preferably a non-thermoplastic adhesive, to the areas of a carton blank, or a sheet to be cut into carton blanks, or a carton after erection from a blank, or to other container members, in the areas desired to be heat sealed. The adhesive used for securing the uncoated side of the heat sealing patch to the carton blank, carton, or sheet from which a carton blank is to be cut, et cetera, will in general be water-borne adhesives, such as common starch, dextrin, casein, polyvinyl acetate, resorcinol glues, or the like. Although it is preferred that these heat insensitive adhesives be non-thermoplastic at the time the carton is heat sealed, they may be thermoplastic at the time of application, and upon further cure become non-thermoplastic, such as phenol-formaldehyde type adhesives, urea or melamine adhesives, epoxies, polyesters, and others well known in the art.

If desired, the adhesive with which the patch of heat sealing material is to be secured to the carton blank, carton, or sheet from which the blank is cut, et cetera, may be preapplied to the side of the sheet opposite the heat sealing material. The adhesive then merely requires remoistening for applying the patch to the desired surface area after the hot melt composition is applied to the web.

A large number of thermoplastic adhesives may be used in practicing the present invention, including those well known in the art. Such materials as wax compositions having a melt viscosity in excess of 100 centipoises, low molecular weight polyethylenes, ethyl cellulose hot melts, vinyl resins, either plasticized or unplasticized, rubber-containing compositions, and the like, are entirely adequate. The materials should not cold flow or, when not intercalated, block after application to the desired container surface, and they will generally have a blocking point in excess of 100° F. If necessary, the compositions may be prevented from blocking by the application of starch or clay dust, or by the application of topical treatments, silicone emulsions, and the like, which will prevent blocking, and such materials are preferably applied while the heat sealing material is still in continuous web form.

The present method of providing heat sealing cartons is particularly advantageous when they are to be constructed from thermoplastic laminated sheets, such as sheets laminated together with waxes, wherein the local surface application of a thermoplastic adhesive, especially in the form of a hot melt, would normally disturb the laminating adhesive, or cause delamination. By the present invention it is possible to provide a heat sealing carton or other container of laminated stock, the thermoplastic adhesive being applied to a bearing sheet independently of the container, carton blank, carton, or sheet from which the blank is to be cut, patches of this material then being applied to localized areas of the laminated sheet, container, carton, or carton blank where it is ultimately to be heat sealed.

The following examples describing the method of preparation of adhesive patch and strip material according to the invention are given by way of illustration only and are not to be construed as limiting.

*Example 1*

A 30 lb. per ream sulfite waxing stock paper was coated on one side with a composition containing 70% paraffin wax having a melting point of 150° F., and 30% of Elvax 250, an ethylene-polyvinyl acetate copolymer having a melt index of 15 and an ethylene to vinyl acetate ratio of 72:28. This composition was applied in an amount of 30 lbs. per ream (3000 square feet) to the continuous web sheet using a roll applicator and a wire wound metering rod. After coating, the wound roll was slit into smaller rolls approximately two inches wide, and from these were cut patches of the shape generally shown in FIGURE 9. These were applied to the flap areas of a chip board folding carton, also shown in FIGURE 9, using a heat insensitive emulsion-type adhesive of the polyvinyl acetate type. After the mounting adhesive had dried, the carton was set up in such a manner that the flap areas were in proper overlapping relationship, heat was applied to the ends of the carton, and then the ends of the carton cooled. It was found that a heat seal was obtained which was stronger than the chip board from which the carton was constructed.

Example 2

A 50 lb. opaque lithographic sheet was laminated to a 31 lb. dry waxed kraft sheet using a composition consisting of 1½% tallow fatty acid amide, 1½% titanium dioxide, 13% finely divided hydrous attapulgite, and 84% microcrystalline wax having a melting point of 155° F., the laminating composition being applied in an amount of approximately 100 lbs. per ream (3000 square feet). After laminating, small slits were cut in the dry waxed sheet to expose small areas of the laminating adhesive, in the manner of FIGURE 6, and patches were cut from this sheet. The patches were glued with the lithographic sheet next to the surfaces of flap areas of a carton blank, using a polyvinyl alcohol based adhesive. When the flap areas were brought into overlapping relationship and heat applied, a very strong heat seal was obtained.

There are many variations and embodiments of the present method and means of application of localized heat sealing areas to cartons, carton blanks, or sheets from which carton blanks are to be cut. The patches and the principles involved may also be applied to backing board-blister pack containers, trays and corresponding tray lids, cylindrical containers with corresponding overlapping or abutting closure members, or any other container structure in which localized application of thermoplastic materials is desired for heat sealing purposes.

It is to be understood that the invention is not to be limited to the exact details of operation or exact compounds, compositions, or structures shown and described, as obvious modifications and equivalents will be apparent to one skilled in the art, and the invention is therefore to be limited only by the scope of the appended claims.

I claim:

1. A heat sealable carton having underlying and outer cover flaps, an adhesive patch comprising a web having a heat-insensitive adhesive layer on one surface bonding said patch to one member of said outer and underlying cover flaps, and a coating of a thermoplastic adhesive on the other surface of said web.

2. A heat sealable carton having inner, intermediate and outer cover flaps, an adhesive patch bonded to one member of said inner and outer cover flaps comprising a web having an adhesive layer on one surface bonding said patch to said cover flap and a coating of a thermoplastic adhesive on the other surface, said intermediate cover flap being dimensioned to permit said adhesive patch to bypass said intermediate flap and to oppose the other member of said inner and outer cover flaps when said carton is closed for sealing.

3. A carton according to claim 2 wherein said intermediate cover flap is provided with apertures contoured and positioned to permit said adhesive patch to pass thereinto and oppose the cover flap at the other side thereof.

4. A carton according to claim 2 wherein said thermoplastic adhesive comprises microcrystalline wax.

5. A heat sealable carton having inner, intermediate and outer closure flaps, a pair of adhesive patches adhesively affixed one at each edge of one member of said inner and outer closure flaps, said adhesive patches each comprising a web having an adhesive layer on one surface bonding said patch to said closure flap and a coating of a thermoplastic adhesive on the other surface thereof, the edges of said intermediate closure flap being recessed to permit said adhesive patch to bypass said intermediate flap and to oppose the other member of said outer and inner closure flaps.

6. A heat sealable carton having underlying and outer closure flaps, an adhesive patch comprising a pair of webs having an intercalated thermoplastic adhesive, an adhesive on the outer surface of one of said webs bonding said patch to one member of said underlying and outer closure flaps, the other of said webs being provided with openings to enable said thermoplastic adhesive to be extruded to the surface of said web.

7. A heat sealable carton having inner, intermediate and outer closure flaps, an adhesive patch bonded to one member of said inner and outer closure flaps comprising a pair of webs having an intercalated thermoplastic adhesive, an adhesive on the outer surface of one of said webs bonding said patch to said closure flap and the other web being provided with openings to enable said thermoplastic adhesive to be extruded to the surface of said web, said intermediate closure flap being dimensioned to permit said adhesive patch to bypass said intermediate flap and to oppose the other member of said inner and outer closure flaps when said carton is closed for sealing.

8. A carton according to claim 7 wherein said intermediate closure flap is provided with apertures contoured and positioned to permit said adhesive patch to pass thereinto and oppose the closure flap at the other side thereof.

9. A carton according to claim 7 wherein said thermoplastic adhesive comprises microcrystalline wax.

10. A heat sealable carton having inner, intermediate and outer closure flaps, a pair of adhesive patches adhesively affixed one at each edge of one member of said inner and outer closure flaps, said adhesive patches each comprising a pair of webs having an intercalated thermoplastic adhesive layer, the outer surface of one web having an adhesive coating for bonding to said carton and the other web being provided with openings communicating with said thermoplastic adhesive layer, the edges of said intermediate closure flap being recessed to permit said adhesive patch to bypass said intermediate flap and to oppose the other member of said outer and inner closure flaps.

11. A carton according to claim 5 wherein said thermoplastic adhesive is microcrystalline wax.

12. A heat-sealable carton according to claim 6 wherein said thermoplastic adhesive is microcrystalline wax.

References Cited by the Examiner

UNITED STATES PATENTS

| | | | |
|---|---|---|---|
| 1,944,834 | 1/1934 | Bennett | 161—114 |
| 2,063,999 | 12/1936 | Harrison | 229—51 |
| 2,317,730 | 4/1943 | Calvert | 161—114 |
| 2,341,845 | 2/1944 | Mark et al. | 229—37 |
| 2,430,755 | 11/1947 | Bergstein | 93—49.1 |
| 2,515,327 | 7/1950 | Bergstein | 93—49.1 |
| 2,561,064 | 7/1951 | Ness | 117—68.5 |
| 3,051,588 | 8/1962 | Lavanchy | 117—68.5 |
| 3,070,277 | 12/1962 | Moore | 229—37 |
| 3,126,143 | 3/1964 | Hagan | 229—37 |

GEORGE O. RALSTON, *Primary Examiner.*

FRANKLIN T. GARRETT, *Examiner.*

V. A. TOMPSON, *Assistant Examiner.*